United States Patent [19]

Atkins

[11] Patent Number: 5,146,762

[45] Date of Patent: Sep. 15, 1992

[54] EVAPORATIVE COOLING SYSTEM FOR BUILDINGS

[76] Inventor: Robert C. Atkins, 3555 Agricultural Center Dr., St. Augustine, Fla. 32092

[21] Appl. No.: 795,496

[22] Filed: Nov. 21, 1991

[51] Int. Cl.$^5$ .......................................... B01D 47/16
[52] U.S. Cl. ...................................... 62/171; 261/98; 454/328; 454/337
[58] Field of Search ............... 62/171, 314, 309, 259.4; 454/328, 337; 236/44 B; 261/98

[56] References Cited

U.S. PATENT DOCUMENTS

| | | | |
|---|---|---|---|
| 2,427,714 | 9/1947 | Cooper | 454/328 X |
| 2,497,947 | 2/1950 | Lewis | 454/337 |
| 4,031,180 | 6/1977 | Bohanon | 454/328 X |
| 4,047,328 | 9/1977 | Kehl et al. | 454/337 X |
| 4,951,480 | 8/1990 | Brence | 62/314 X |

Primary Examiner—William E. Wayner
Attorney, Agent, or Firm—Thomas C. Saitta

[57] ABSTRACT

An evaporative cooling system for buildings comprising means to draw air from the building, air ingress means having air permeable pads in an opening in the building, and water supply means to supply water to fogger nozzles which direct a water vapor fog toward the external surface of the pads, thus cooling the air drawn through the pads. The fogger nozzles are connected to interconnected water conduits, one of which is independently operated from the others such that it will only operate in cases of extreme temperature, to insure that the pads will not be oversaturated. Preferably, the water conduits are controlled by a thermostat responsive to the internal building temperature, while the independent conduit is controlled by a second thermostat responsive to the external ambient temperature.

10 Claims, 2 Drawing Sheets

EVAPORATIVE COOLING SYSTEM FOR BUILDINGS

BACKGROUND OF THE INVENTION

The invention relates generally to the field of cooling systems for buildings, and more particularly to the field of evaporative cooling systems in which ambient air is cooled by drawing it through a fine liquid mist or fog before it enters the building.

Evaporative cooling systems for buildings are known. Typical structures on which these systems are used are poultry and other animal houses, warehouses, etc. The concept of evaporative air cooling is based on the fact that the temperature of air drawn through a spray or a wet pad will be lower due to the transfer of heat from the air to the water, causing the water to evaporate.

In one of its simplest forms, buildings can be cooled by placing fogger nozzles to spray a fine mist of water in the interior of the building and using a fan system to draw air in a single direction through the building. This method is low in efficiency, and suffers the problem of accumulation of excess moisture in the interior, increasing the humidity and creating algae and bacteria problems. To improve on this method, evaporative cooling systems have been developed in which the fogger nozzles are placed exterior to the building. For example, Bohanon in U.S. Pat. No. 4,031,180 shows a system where pads are placed in an opening in the building wall and a water drip or infusion system is placed along the top of the pads to soak the pads thoroughly. Air is then drawn through the pads to be cooled. This system results in a large excess of water which must be captured and then recycled or discarded. Furthermore, because the pads are saturated, there are problems of algae build-up and pad deterioration requiring frequent pad replacement. Given that replacement pads for a single building may cost several thousands of dollars, this system is not desirable. Addressing the excess water problem, Van Huis in U.S. Pat. No. 3,965,691 teaches a system to be used in buildings having vents running the length of the building between the tops of the walls and the roof. Angled pads are mounted along the length of the roof and water is sprayed upward onto the underside of the pads. The water spray is controlled by timers such that the spray is intermittent rather than constant during the time period needed to cool the building in order to prevent oversaturation of the pads. Any run-off drips down to the outside of the building. For evaporative cooling systems to work in large buildings, it is necessary to draw a large amount of air through the building. This is usually accomplished by one or more large exhaust fans mounted into an end wall. The Van Huis system is not efficient since the air intake is spread over the entire length of the building, resulting in vast differences in the air flow rates through the pads at different points in the building, depending on the proximity to the exhaust fans. The portions of the Van Huis system far from the fans will have little cooling effect at all.

The evaporative cooling system developed and described herein eliminates the problems and shortcomings of the known systems. The invention is designed such that there will be no or only minimal water run-off and no pad saturation resulting in algae build-up or pad deterioration. This is accomplished by controlling the water droplet size and application zone, and by having an independent set of fogger nozzles operative only under extreme external conditions. The invention is designed so that the air flow is the same over all points of the intake system by placing the pads at positions of maximum distance from the air exhaust fans and maximizing the draw-through surface area at these focused locations, using a tunnel effect to maximize air and water contact.

SUMMARY OF THE INVENTION

The invention is an evaporative cooling system for use in large buildings, where intake air is drawn through a fine fog of water prior to its entry into the building. Heat energy in the air is transferred to the moisture, and the heat loss from the resulting evaporation lowers the temperature of the air. In general, the invention comprises means to draw inside air out of a building, such as by exhaust fans positioned in an end wall, air ingress means utilizing pads permeable to air to allow outside air into the building, and fogger means to produce a fine water vapor fog proximate to the exterior of the air ingress means. The air ingress means are located at the opposite end of the building from the exhaust fans, and preferably are two in number and positioned across from each other. The air ingress means and fogger means are enclosed within a four sided curtain to control the evaporative zone. The fogger means comprise a number of spaced fogger nozzles which produce water droplets less than 47 microns in diameter. The system can be manually operated or automatically actuated in response to the internal building temperature, the external temperature, or both. Preferably, two sets of nozzles having different flow rates and operated by two distinct controllers are used, such that all of the nozzles are operative only under extreme external temperature conditions.

DETAILED DESCRIPTION OF THE INVENTION

Figure 1:
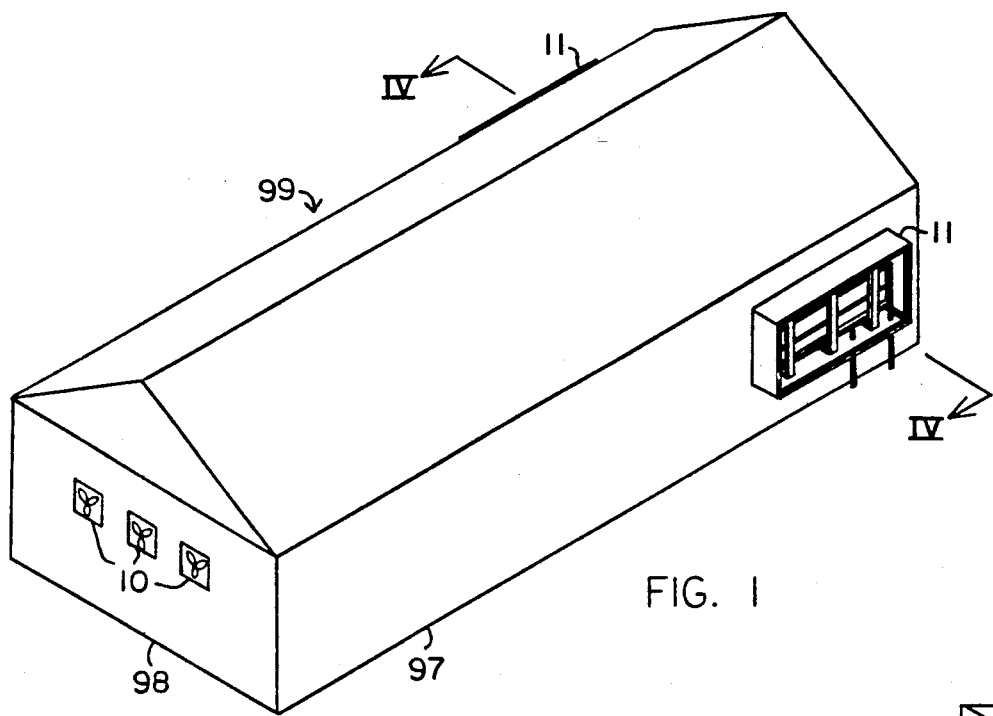
FIG. 1 is an external view of a building utilizing the cooling system.
Figure 4:
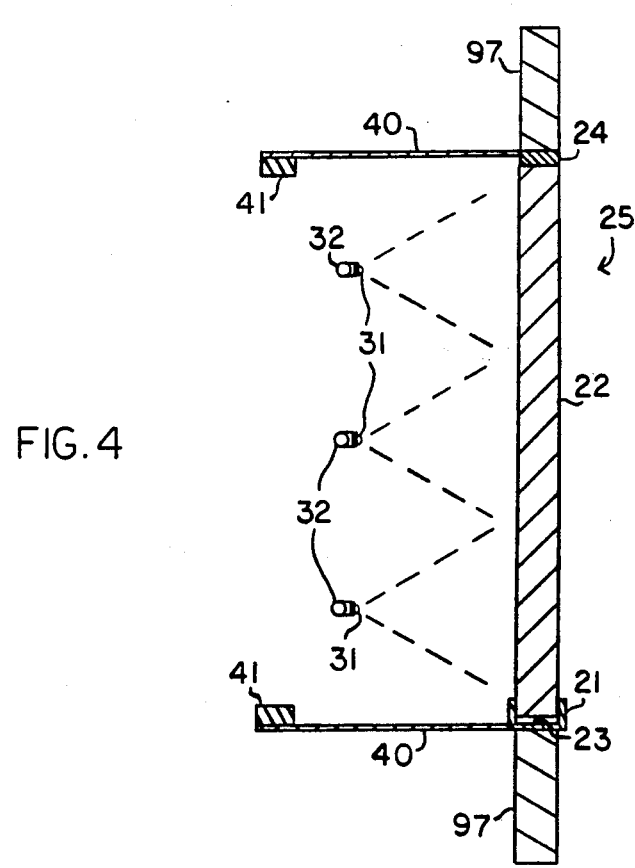
FIG. 4 is a cross-sectional view of an air ingress and fogger means taken along line IV—IV of FIG. 1.
Figure 2:
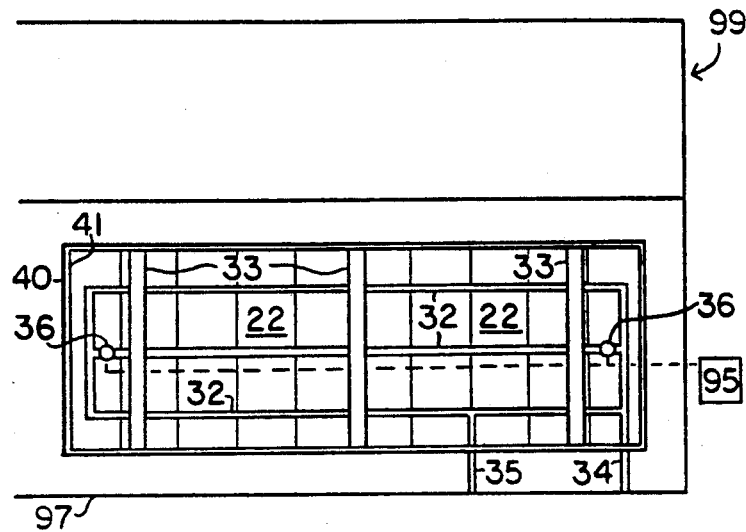
FIG. 2 is an exterior view of an air ingress and fogger means.
Figure 3:
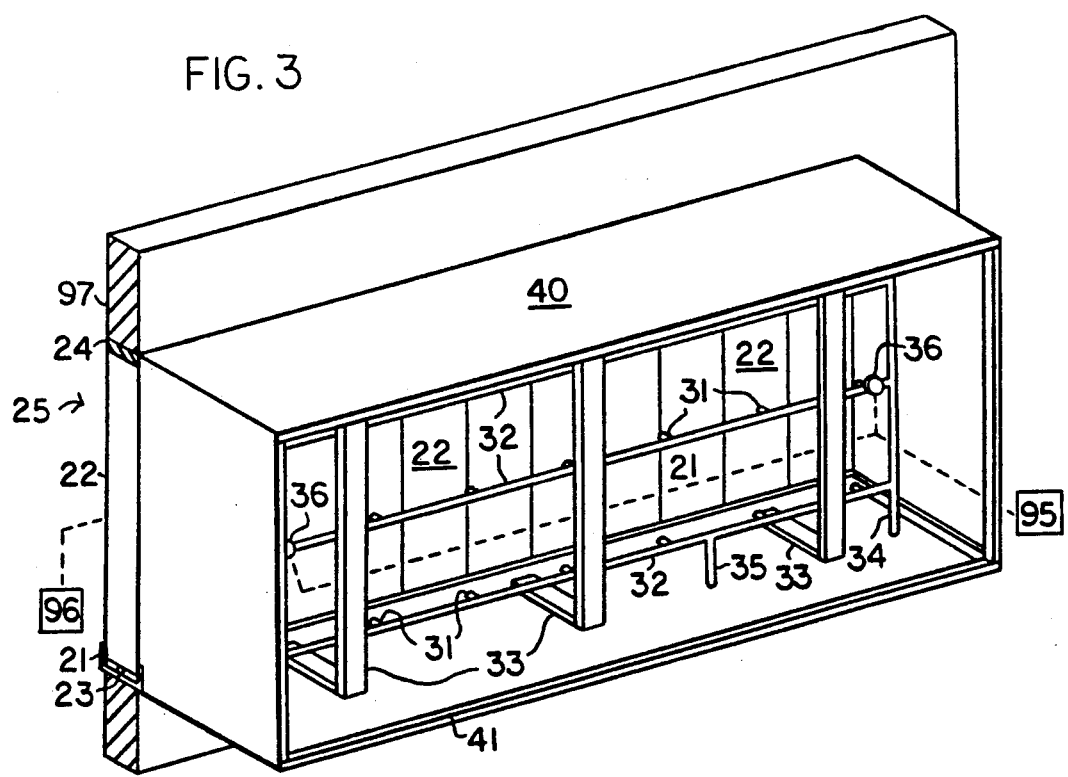
FIG. 3 is an exposed perspective view of the exterior of an air ingress and fogger means.

The invention is especially applicable for long, narrow buildings, such as are typical for poultry houses, but can be utilized in any building having a relatively open interior. With reference to FIG. 1, it is seen that the invention comprises means to draw air out of a building, such as by one or more exhaust fans 10 located at one of the narrow ends 98 of the building 99. Preferably, two similar sized evaporative cooling assemblies 11 are located at the far end of the building, one on each long side wall 97, with each cooling assembly 11 being directly opposite the other. Exhaust fans 10 draw air out from the interior of building 99, causing air to be drawn into building 99 through the cooling assemblies 11. By locating the exhaust fans 10 and the cooling assemblies 11 at substantially maximum distance from each other, a tunnel effect is created in that the flow path of the air in the interior of building 99 is uni-directional from one narrow end 98 to the other. Exhaust fans 10 can be of any standard type known in the industry, and any substitute means of drawing air out of building 99 can be utilized as well.

Referring now to the remaining figures, the components of the evaporative cooling assemblies 11 is illustrated. In general, each cooling assembly 11 comprises an air ingress means 20 and a fogger means 30. Air ingress means 10 comprises an opening in the wall 97 of building 99 preferably rectangular, in which are positioned vertical cooling pads 22 so as to completely fill the opening. Cooling pads 22 are of any known type of filter or porous composition capable of receiving water spray thereon and allowing air flow therethrough, such as those composed of cellulose fiber, plasticized foam or the like, which are relatively self-supporting in the vertical direction. Typical dimensions for pads 22 are 5 feet by 1 foot by 4 inches in thickness. The pads 22 are supported by pad support means 21 on the bottom, which consists of any suitable support material, but preferably is a U-shaped PVC channel as shown, and by pad support framework 24 on the top and sides, which can be constructed of wood or the like. Preferably, pads 22 are separated from the bottom of pad support means 21 by a spacer 23, such as a section of PVC pipe, which creates an accumulation area for the minimal run-off encountered with this system. This accumulated run-off will readily evaporate, except under extreme conditions in which case the excess is allowed to flow out of the pad support means 21. The purpose of exhaust fans 10 is to draw external ambient air through pads 22 from the exterior and into the interior of building 99.

To cool the ambient air being drawn into the building 99, fogger means 30 are positioned on the exterior side of cooling pads 22. Fogger means 30 comprises a number of fogger nozzles 31 mounted on a number of interconnected water conduits 32. Fogger nozzles 31 are positioned such that the central axis of the spray direction is perpendicular to the external face of pads 22. Preferably the fogger nozzles are spaced 18 inches from each other vertically and horizontally, and are positioned 30 inches from the surface of pads 22. It is important that the output of fogger nozzles 31 be as fine as possible, since any heavy stream or spray of water will achieve less transfer of heat energy via evaporation and will over-saturate the pads 22. Fogger nozzles 31 should produce water droplets less than 47 microns in diameter, with a preferred maximum size of 30 microns.

Conduits 32 are mounted on conduit framework 33, which can be constructed of any suitably strong material, such as wood. Preferably, there are three horizontal rows of conduits 32 all interconnected at each end. A water supply conduit 34 provides water for the fogger nozzles 31 and a water drain conduit 35 removes any excess water not expelled through the nozzles 31. Preferably, two valves 36 are mounted at each end of the middle conduit 32, such that the upper and lower conduits 32 can be operated without operating the middle conduit 32. Preferably, the fogger nozzles 31 on the middle conduit 32 are of greater flow rate than that of the fogger nozzles 31 on the upper and lower conduits 32. The upper and lower fogger nozzles 31 have a preferable flow rate of one-half gallon per hour, while the middle fogger nozzles 31 have a preferable flow rate of one gallon per hour. The desired flow rates are variable and are related to the size of the building being cooled.

The fogger means 30 is encased in a water and air impermeable screen 40 on the top, bottom and sides which encloses the air ingress means 20. Screen 40 can be composed of any suitable material, with a lightweight plastic material mounted on wooden framing 41 being preferable. The screen 40 should extend from the surface of wall 97 beyond the fogger nozzles 31 and conduits 32. This screen 40 controls the evaporative area, preventing wind from disturbing the fogger pattern of the nozzles 31, thus maximizing the evaporative conditions and insuring that the pads 22 are not over or under saturated.

The evaporative cooling system may be operated manually by allowing water to flow into the water supply conduit 34 and out the fogger nozzles 31 until the internal building temperature is lowered and then shutting off the water supply. Preferably though, a thermostat controlled actuating system 96, shown schematically in the illustrations, of any type known in the art is utilized. Upon the internal temperature reaching a predetermined maximum desirable high temperature, water is automatically supplied to the water supply conduit 34 and the exterior fogging action commences. When the desired internal temperature is reached, the system automatically shuts off. In the preferred embodiment, the middle conduit 32 is operated not by action of the internal thermostat 96, but rather by a second external thermostat controlled actuating system 95 which is responsive only to the external temperature and controls valves 36 located at each end of the middle conduit 32. When valves 36 are not actuated by the external thermostat 95, no water flows through the middle conduit 32 even when water is flowing through the upper and lower conduits 32. The external thermostat 95 is set at a higher temperature for activation than the internal thermostat 96, whereby the fogger nozzles 31 on middle conduit 32 will not be used except in conditions of extreme ambient heat. For example, the internal thermostat 96 will be set to activate the fogging action of the upper and lower conduits 32 at roughly 84 degrees, while the external thermostat 95 will be set for thoroughly 96 degrees, so that the middle conduit 32 will only be activated when the external temperature is of such an extreme that extra evaporation is required to sufficiently cool the air drawn into the pads 22, thereby conserving water and preventing excess saturation of the pads 22 under situations of only slightly elevated temperature.

The length of the evaporative cooling assembly 11 is determined by the overall length and size of the building 99. In general, the evaporative cooling assembly will be from 20 to 50 feet long, representing roughly 10 percent of the overall building 99 length. When fully activated, an evaporative cooling assembly will fog from 80 to 200 gallons of water per hour. The typical excess accumulation of water below pads 22 will range from one gallon per hour in normal circumstances to a maximum of 5 gallons per hour during periods of high humidity. Use of the invention causes a drop of approximately 20 degrees from the outside air temperature to the inside air temperature.

The above examples are by way of illustration only, and it may be obvious to those skilled in the art that substitutions and equivalents exist. The full scope and definition of the invention therefore is to be as set forth in the following claims.

I claim:

1. An apparatus for cooling buildings by the evaporative cooling process, comprising:

(A) means to draw air out of a building;

(B) air ingress means to allow exterior air to be drawn into said building comprising an opening in a wall of said building and a plurality of air permeable pads positioned vertically within said opening, said pads each having an exterior face, and air ingress means positioned at substantially maximum distance from said means to draw air out of the building;

(C) an evaporative cooling assembly comprising at least one water conduit, a plurality of fogger nozzles connected to said water conduit and directed at said exterior faces of said pads, where said water conduit supplies water to said fogger nozzles, and a water and air impermeable screen extending from said wall of said building and surrounding said air ingress means, said water conduit and said fogger nozzles.

2. The apparatus of claim 1, where said water conduit comprises a plurality of interconnected conduits, each having a plurality of said connected fogger nozzles.

3. The apparatus of claim 2, where said water conduit comprises three horizontal interconnected conduits.

4. The apparatus of claim 1, where said fogger nozzles produce water droplets less than 47 microns in diameter.

5. The apparatus of claim 1, further comprising a thermostat controlled actuating system responsive to the internal building temperature to supply water to said water conduit.

6. An apparatus for cooling buildings by the evaporative cooling process, comprising:

(A) means to draw air out of a building;

(B) air ingress means to allow exterior air to be drawn into said building comprising an opening in a wall of said building and a plurality of air permeable pads positioned vertically within said opening, said pads each having an exterior face, said air ingress means positioned at substantially maximum distance from said means to draw air out of the building;

(C) an evaporative cooling assembly comprising a plurality of interconnected water conduits, a plurality of fogger nozzles connected to said water conduits and directed at said exterior faces of said pads, where said water conduits supply water to said fogger nozzles, and a water and air permeable screen extending from said wall of said building and surrounding said air ingress means, said water conduits and said fogger nozzles.

7. The apparatus of claim 6, further comprising valves on one of said interconnected water conduits, where said valves control the supply of water to said one water conduit independent of the water supply to the remaining water conduits.

8. The apparatus of claim 7, further comprising an internal thermostat controlled actuating system responsive to the internal building temperature to supply water to said water conduits; and an external thermostat controlled actuating system responsive to the external temperature to control said valves controlling the supply of water to said independent water conduit.

9. The apparatus of claim 8, where said interconnected water conduits comprise three horizontal conduits, and where said independent water conduit is the middle water conduit.

10. The apparatus of claim 1, where said fogger nozzles on said independent water conduit are of greater flow rate than said fogger nozzles on said remaining water conduits.

* * * * *